United States Patent
Wei et al.

(10) Patent No.: US 12,068,700 B2
(45) Date of Patent: Aug. 20, 2024

(54) PIEZOELECTRIC MOTOR ENERGY-SAVING CONTROL METHOD BASED ON AN ITERATIVE LEARNING

(71) Applicant: Guangzhou University, Guangdong (CN)

(72) Inventors: Yunshan Wei, Guangzhou (CN); Yingyu Chen, Guangzhou (CN); Zhijia Zhao, Guangzhou (CN); Qingyuan Xu, Guangzhou (IN); Kai Wan, Guangzhou (CN)

(73) Assignee: Guangzhou University, Guangzhou (CN)

( * ) Notice: Subject to any disclaimer, the term of this patent is extended or adjusted under 35 U.S.C. 154(b) by 214 days.

(21) Appl. No.: 17/799,551

(22) PCT Filed: Nov. 10, 2020

(86) PCT No.: PCT/CN2020/127712
§ 371 (c)(1),
(2) Date: Aug. 12, 2022

(87) PCT Pub. No.: WO2021/159786
PCT Pub. Date: Aug. 19, 2021

(65) Prior Publication Data
US 2023/0055214 A1 Feb. 23, 2023

(30) Foreign Application Priority Data
Feb. 13, 2020 (CN) .......................... 202010090671.7

(51) Int. Cl.
H02N 2/00 (2006.01)
(52) U.S. Cl.
CPC ........... *H02N 2/0075* (2013.01); *H02N 2/001* (2013.01)
(58) Field of Classification Search
CPC .............................. H02N 2/0075; H02N 2/001
See application file for complete search history.

(56) References Cited

U.S. PATENT DOCUMENTS

2009/0222109 A1* 9/2009 Takagi ............... G03F 7/70725
700/44
2013/0116814 A1 5/2013 Yang

FOREIGN PATENT DOCUMENTS

CN 106325072 A 1/2017
CN 108536007 A 9/2018
(Continued)

OTHER PUBLICATIONS

Lee et al., "Compensation of Hysteresis in Piezoelectric Actuator with Iterative Learning Control", IEEE/ASME International Conference on Advanced Intelligent Mechatronics Sunfec Convention and Exhibition Center, pp. 1300-1505 (Year: 2009).*
Huynh et al., "Extreme Precise Motion Tracking of Piezoelectric Positioning Stage Using Sampled-Data Iterative Learning Control", IEEE, pp. 3376-3381 (Year: 2011).*
International Search Report dated Dec. 30, 2020, Application No. PCT/CN2020/127712.

*Primary Examiner* — Emily P Pham
(74) *Attorney, Agent, or Firm* — The Dobrusin Law Firm, PC

(57) ABSTRACT

An iterative learning-based energy-saving control method for a piezoelectric motor, comprising: setting a sampling period of a piezoelectric motor (101); obtaining an expected output trajectory of the piezoelectric motor, and performing sampling according to the sampling period to obtain a sampled expected output sequence (102); setting an initial control input signal of the piezoelectric motor (103); obtaining an actual control input signal according to a mapping relation of the initial control input signal, and transmitting the actual control input signal to the piezoelectric motor to obtain an actual output position (104); obtaining a mapping relation of the output position of the piezoelectric motor according to the actual output position, and sampling the mapping relation according to the sampling period to obtain (Continued)

a sampled actual output sequence (105); calculating the difference between the sampled expected output sequence and the sampled actual output sequence to obtain a sampling error function sequence (106); obtaining an iterative learning gain parameter by calculation according to a preset convergence condition (107); and obtaining, by calculation according to the sampling error function sequence and the iterative learning gain parameter, an iterative input voltage required by iteration of the piezoelectric motor, and transmitting the iterative input voltage to the piezoelectric motor (108).

11 Claims, 3 Drawing Sheets

(56) References Cited

FOREIGN PATENT DOCUMENTS

| CN | 109039173 A | 12/2018 |
|---|---|---|
| CN | 109787531 A | 5/2019 |
| CN | 110488759 A | 11/2019 |
| EP | 1278109 A1 | 1/2003 |
| EP | 1923765 A1 | 5/2008 |

\* cited by examiner

PIEZOELECTRIC MOTOR ENERGY-SAVING CONTROL METHOD BASED ON AN ITERATIVE LEARNING

TECHNICAL FIELD

The present invention relates to the technical field of motor control, in particular to a piezoelectric motor energy-saving control method based on an iterative learning.

TECHNICAL BACKGROUND

In some high-precision control engineering occasions, not only the controlled system is required to repeat the same control task in a limited range, but also the output of the controlled system must strictly follow the expected output trajectory. Precise control of high-speed motors is a challenging engineering task. Due to the delayed response of the motor system, there is a certain response time delay after the control input, which causes the existence of many difficulties in controlling high-speed motors. If an accurate model of the system cannot be obtained, most mainstream control algorithms based on time domain information cannot complete high-speed precise tracking control, and there are also intolerable subtle external disturbances.

Piezoelectric motors use piezoelectric bodies to vibrate under the influence of voltage to drive moving parts to rotate or move linearly. In the existing technology, an iterative learning control scheme may be used to overcome the problem of response time delay in high-speed motor control, which does not require accurate motor models and parameters, and has the ability to resist external interference and external noise. However, the iterative learning control scheme used in the industry currently has obvious shortcomings, that is, the time interval to be controlled is required to be fixed, which greatly limits the application scope of the control scheme. In addition, most control schemes require constant control input throughout the motor control process, which results in a lot of unnecessary energy waste. Taking the control problem of a motor-driven robotic arm as an example, when controlling the robotic arm to complete a certain action, the amplitude and duration of each action swing are usually not fixed, so it is actually a control problem of variable time interval.

SUMMARY OF THE INVENTION

The invention provides a piezoelectric motor energy-saving control method based on an iterative learning, which may control the piezoelectric motor to end input at a specific time in advance when approaching a target point, so that a robotic arm may reach the target point by inertia, thereby saving energy consumption.

In order to solve the above technical problems, an embodiment of the present invention provides a piezoelectric motor energy-saving control method based on an iterative learning, characterized in that, comprising:
  setting a sampling period of a piezoelectric motor;
  obtaining an expected output trajectory of the piezoelectric motor, and performing a sampling according to the sampling period to obtain a sampled expected output sequence;
  setting an initial control input signal of the piezoelectric motor;
  obtaining an actual control input signal according to a mapping relationship of the initial control input signal, and transmitting the actual control input signal to the piezoelectric motor to obtain an actual output position of the piezoelectric motor;
  obtaining a mapping relationship of an output position of the piezoelectric motor according to the actual output position, and performing a sampling on the mapping relationship of the output position of the piezoelectric motor according to the sampling period to obtain a sampled actual output sequence;
  performing a difference calculation between the sampled expected output sequence and the sampled actual output sequence to obtain a sampling error function sequence;
  calculating an iterative learning gain parameter according to a preset convergence condition;
  calculating an iterative input voltage required by the piezoelectric motor for performing iterations according to the sampling error function sequence and the iterative learning gain parameter, and transmitting the iterative input voltage to the piezoelectric motor.

As a preferred option, after transmitting the iterative input voltage to the piezoelectric motor, the method further comprises: repeating steps of the iterations until the sampling error function sequence is smaller than a preset allowable error value range, stopping the iterations.

As a preferred option, the specific step of setting the sampling period of the piezoelectric motor is: setting the sampling period $T_s$ of the piezoelectric motor, the sampled discrete sequence is $$n \in \left\{0, 1, 2, \ldots, \left\lfloor \frac{T}{T_s} \right\rfloor\right\};$$

then a corresponding discrete time series is:

$$t \in \left\{0, T_S, 2T_S, \ldots, \left\lfloor \frac{T}{T_s} \right\rfloor \cdot T_S\right\};$$

where t is a running time.

As a preferred option, the step of obtaining an expected output trajectory of the piezoelectric motor, and performing a sampling according to the sampling period to obtain a sampled expected output sequence comprises: obtaining the expected output trajectory $y_d(t)$, performing the sampling according to the sampling period $T_s$ to obtain the sampled expected output sequence $y_d(n \cdot T_s)$, $$n \in \left\{0, 1, 2, \ldots, \left\lfloor \frac{T}{T_s} \right\rfloor\right\},$$

and defining the sampled expected output sequence as $\hat{y}_d(n)$.

As a preferred option, the specific step of setting the initial control input signal of the piezoelectric motor comprises: setting an initial continuous input signal of the piezoelectric motor as $\tilde{u}_0(t)$, which satisfies:

$$\tilde{u}_0(t) = \begin{cases} \tilde{u}_0(0), & t \in [0, T_S) \\ \tilde{u}_0(T_S), & t \in [T_S, 2T_S) \\ \vdots \\ \tilde{u}_0\left(\left\lfloor \frac{T}{T_S} \right\rfloor \cdot T_S\right), & t \in \left[\left\lfloor \frac{T}{T_S} \right\rfloor \cdot T_S, T\right]. \end{cases}$$

As a preferred option, the mapping relationship of the initial control input signal is:

$$u_k(t) = \begin{cases} \tilde{u}_k(t), & t \in [0, T_k] \\ 0, & t \in (T_k, T] \end{cases};$$

wherein $u_k(t)$ is the actual control input signal.

As a preferred option, the mapping relationship of the output position of the piezoelectric motor is:

$$\tilde{y}_k(t) = \begin{cases} y_k(t), & t \in [0, T_k] \\ y_k(t) + \int_{T_k}^{t} Ce^{A(t-\tau)} B\tilde{u}_k(\tau) d\tau, & t \in (T_k, T] \end{cases},$$

wherein $y_k(t)$ is the actual output position, and $\tilde{y}_k(t)$ is the mapping relationship of the output position of the piezoelectric motor;

the specific step of performing the sampling to obtain the sampled actual output sequence is: performing the sampling on $\tilde{y}_k(t)$ according to the sampling period $T_s$ to obtain the sampled actual output sequence $\tilde{y}_k(n \cdot T_s)$, $$n \in \left\{ 0, 1, 2, \ldots, \left\lfloor \frac{T}{T_S} \right\rfloor \right\},$$

and defining the sampled actual output sequence as $\hat{y}_k(n)$, specifically as follows:

$$\hat{y}_k(n) = \begin{cases} y_k(n \cdot T_S), & n \in \left\{ 0, 1, 2, \ldots, \left\lfloor \frac{T_k}{T_S} \right\rfloor \right\} \\ y_k(n \cdot T_S) + \int_{T_k}^{n \cdot T_S} Ce^{A(n \cdot T_S - \tau)} B\tilde{u}_k(\tau) d\tau, & n \in \left\{ \left\lceil \frac{T_k}{T_S} \right\rceil, \left\lfloor \frac{T_k}{T_S} \right\rfloor + 1, \ldots, \left\lfloor \frac{T}{T_S} \right\rfloor \right\} \end{cases}.$$

As a preferred option, a specific algorithm for performing the difference calculation between the sampled expected output sequence and the sampled actual output sequence is: $\bar{e}_k(n) = \hat{y}_d(n) - \hat{y}_k(n)$; then the sampling error function sequence is:

$$\hat{e}_k(n) = \begin{cases} \bar{e}_k(n), & n \in \left\{ 0, 1, 2, \ldots, \left\lfloor \frac{T_k}{T_S} \right\rfloor \right\} \\ \bar{e}_k(n) - \int_{T_k}^{n \cdot T_S} Ce^{A(n \cdot T_S - \tau)} B\tilde{u}_k(\tau) d\tau, & n \in \left\{ \left\lceil \frac{T_k}{T_S} \right\rceil, \left\lfloor \frac{T_k}{T_S} \right\rfloor + 1, \ldots, \left\lfloor \frac{T}{T_S} \right\rfloor \right\} \end{cases}, $$

then defining:

$$\hat{e}_k(T) = y_d(T) - \tilde{y}_k(T) - \int_{T_k}^{T} Ce^{A(T-\tau)} B\tilde{u}_k(\tau) d\tau.$$

As a preferred option, the preset convergence condition is:

$\|I - LCB\| \leq \rho < 1$.

As a preferred option, the steps of calculating an iterative input voltage required by the piezoelectric motor for performing iterations according to the sampling error function sequence and the iterative learning gain parameter, and transmitting the iterative input voltage to the piezoelectric motor comprise:

according to the sampling error function sequence and the iterative learning gain parameter, an iterative learning control law is set as:

$$\tilde{u}_{k+1}(n \cdot T_S) = \tilde{u}_k(n \cdot T_S) + L\dot{\hat{e}}_k(n), n \in \left\{ 0, 1, 2, \ldots, \left\lfloor \frac{T}{T_S} \right\rfloor \right\},$$

wherein $\tilde{u}_{k+1}(t)$ represents a control input signal of the piezoelectric motor in a k+1-th iteration, $\tilde{u}_k(t)$ represents a control input signal of the piezoelectric motor in a k-th iteration, and an derivative $\dot{\hat{e}}_k(n)$ of the sampling error function sequence is calculated as follows:

$$\dot{\hat{e}}_k(n) = \begin{cases} \dfrac{\hat{e}_k((n+1)) - \hat{e}_k(n)}{T_S}, & n \in \left\{ 0, 1, 2, \ldots, \left\lfloor \frac{T}{T_S} \right\rfloor - 1 \right\} \\ \dfrac{\hat{e}_k(T) - \hat{e}_k(n)}{T_S}, & n = \left\lfloor \frac{T}{T_S} \right\rfloor \end{cases},$$

wherein according to the iterative learning control law, updating the control input signal $\tilde{u}_{k+1}(t)$ of a next iteration, and $\tilde{u}^{k+1}(t)$ satisfies:

$$\tilde{u}_{k+1}(t) = \begin{cases} \tilde{u}_{k+1}(0), & t \in [0, T_S) \\ \tilde{u}_{k+1}(T_S), & t \in [T_S, 2T_S) \\ \vdots \\ \tilde{u}_{k+1}\left( \left\lfloor \frac{T}{T_S} \right\rfloor \cdot T_S \right), & t \in \left[ \left\lfloor \frac{T}{T_S} \right\rfloor \cdot T_S, T \right] \end{cases}.$$

Compared with the existing technology, the embodiments of the present invention have the following beneficial effects:

By calculating the sampling error function sequence and the iterative learning gain parameter, the invention transmits the iterative input voltage, required for the piezoelectric motor to iterate, to the piezoelectric motor, which may control the piezoelectric motor to end input at a specific time in advance when approaching a target point, so that a robotic arm may reach the target point by inertia, thereby saving energy consumption.

DESCRIPTION

The technical solutions in the embodiments of the present invention will be clearly and completely described below with reference to the accompanying figures in the embodiments of the present invention. Obviously, the described embodiments are only some, but not all, embodiments of the present invention. Based on the embodiments of the present invention, all other embodiments obtained by those of ordinary skill in the art without creative efforts shall fall within the protection scope of the present invention.

Figure 1:
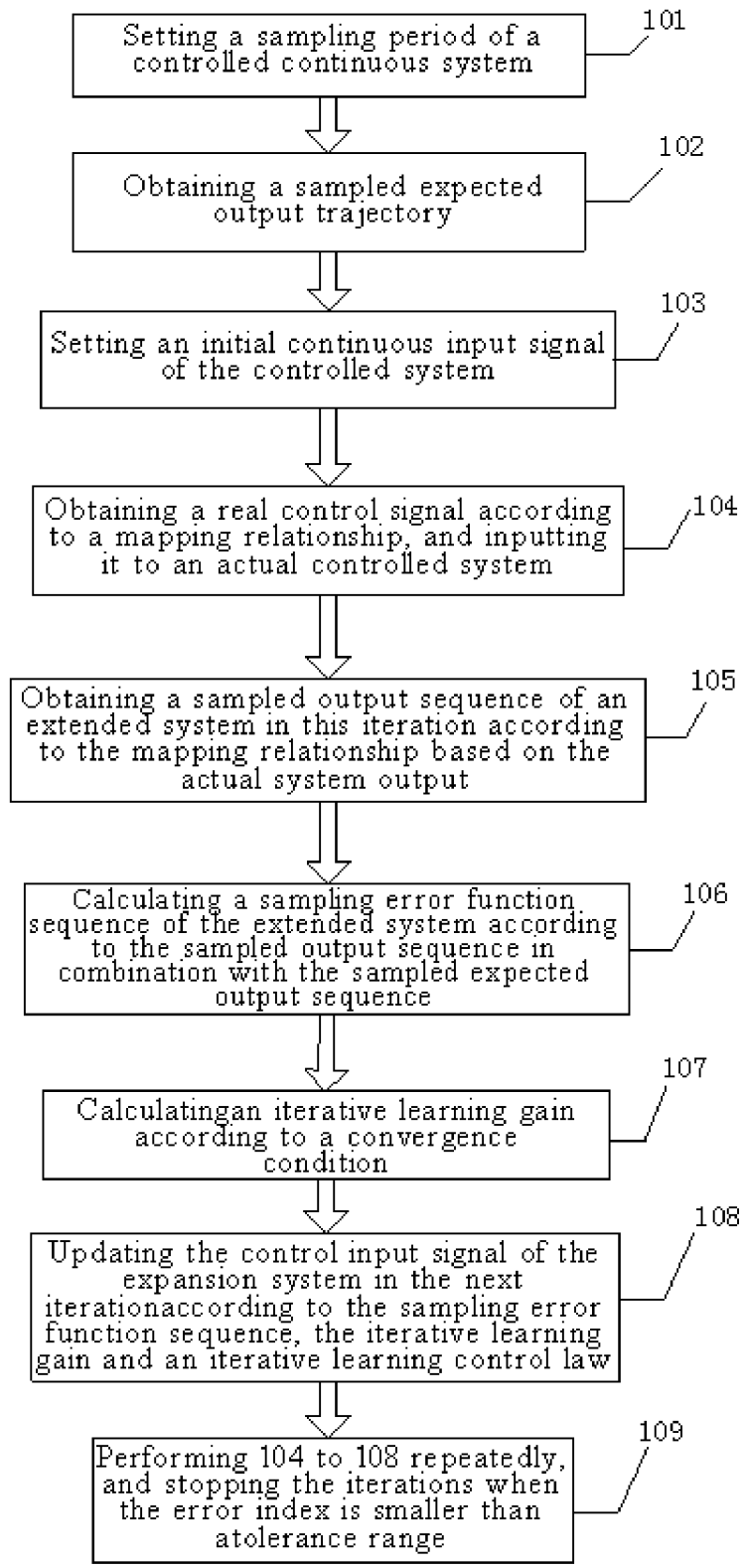
FIG. 1: is a flow chart of the steps of a piezoelectric motor energy-saving control method based on an iterative learning of the present invention.

Referring to FIG. 1, a preferred embodiment of the present invention provides a piezoelectric motor energy-saving control method based on an iterative learning, characterized in that, comprising:

Step 101, setting a sampling period of a piezoelectric motor;

Step 102, obtaining an expected output trajectory of the piezoelectric motor, and performing a sampling according to the sampling period to obtain a sampled expected output sequence;

Step 103, setting an initial control input signal of the piezoelectric motor;

Step 104, obtaining an actual control input signal according to a mapping relationship of the initial control input signal, and transmitting the actual control input signal to the piezoelectric motor to obtain an actual output position of the piezoelectric motor;

Step 105, obtaining a mapping relationship of an output position of the piezoelectric motor according to the actual output position, and performing a sampling on the mapping relationship of the output position of the piezoelectric motor according to the sampling period to obtain a sampled actual output sequence;

Step 106, performing a difference calculation between the sampled expected output sequence and the sampled actual output sequence to obtain a sampling error function sequence;

Step 107, calculating an iterative learning gain parameter according to a preset convergence condition;

Step 108, calculating an iterative input voltage required by the piezoelectric motor for performing iterations according to the sampling error function sequence and the iterative learning gain parameter, and transmitting the iterative input voltage to the piezoelectric motor.

Specifically, a model of a type of piezoelectric motors is as follows:

$$\begin{cases} \dot{x}_{1,k}(t) = x_{2,k}(t), \\ \dot{x}_{2,k}(t) = -\frac{K_v}{M}x_{2,k}(t) + \frac{K_f}{M}u_k(t), \\ y_k(t) = x_{2,k}(t), t \in [0, T_k] \end{cases}$$

$$\begin{cases} \dot{x}_{1,k}(t) = x_{2,k}(t), \\ \dot{x}_{2,k}(t) = -\frac{K_v}{M}x_{2,k}(t), \\ y_k(t) = x_{2,k}(t), t \in (T_k, T] \end{cases}$$

wherein $x_{1,k}(t)$ and $x_{2,k}(t)$ are the motor position and the motor speed, $y_k(t)$ is the motor position. $\overline{M}$ represents the moving mass, $K_v$ is the velocity damping factor, $K_f$ is the force constant of the motor. During the running time interval $[0, T_k]$ the motor has control input, and during the running interval $(T_k, T]$, the motor has no control input, and it moves by inertia.

The piezoelectric motor model may be modeled as the following multiple-input multiple-output continuous system:

$$\begin{cases} \dot{x}_k(t) = Ax_k(t) + Bu_k(t) \\ y_k(t) = Cx_k(t), t \in [0, T_k], \end{cases}$$

-continued
$$\begin{cases} \dot{x}_k(t) = Ax_k(t) \\ y_k(t) = Cx_k(t), t \in (T_k, T], \end{cases}$$

wherein $$x_k(t) = [x_{1,k}(t) \ x_{2,k}(t)]^T,$$

and a linear matrix of the system is:

$$A = \begin{bmatrix} 0 & 1 \\ 0 & -\frac{K_v}{M} \end{bmatrix}, B = \begin{bmatrix} 0 \\ \frac{K_f}{M} \end{bmatrix}, C = [0 \ 1].$$

As shown in the modeled system above, the controlled system operates in a time interval with an upper time limit of T, and it may be regarded as two systems on the time axis. The first system is controlled, its running time length k is iteratively variable, and the running time interval is $[0, T_k]$. The second system control input is 0, its operating interval is $(T_k, T]$, which is easy to know within this time interval $y_k(t)=Ce^{At}x_k(T_k)$. As shown above, in order to make the system reduce the energy consumption of the controlled system on the basis of accurate tracking, it is usually required that each iteration is $T_k \leq T$, and the smaller $T_k$, the better the energy saving effect.

The tracking error of the variable trajectory length system may be expressed as:

$e_k(t)=y_d(t)-y_k(t).$

In order to facilitate the design of the algorithm, we construct a virtual system as follows:

$$\begin{cases} \dot{\tilde{x}}_k(t) = A\tilde{x}_k(t) + B\tilde{u}_k(t) \\ \tilde{y}_k(t) = C\tilde{x}_k(t) \end{cases}$$

The virtual system is an expansion system of the original system, which unifies the running time of the original segmented system as $t \in [0,T]$. The mapping relationship between the input $\tilde{u}_k(t)$ of the virtual system and the input $u_k(t)$ of the original system is:

$\tilde{u}_k = u_k(t), t \in [0,T_k],$ then when $t \in [0, T_k]$, the mapping relationships between the state, output and error of the virtual system and the original system are:

$\tilde{x}_k(t) = x_k(t), t \in [0, T_k],$ $$\tilde{y}_k(t) = \begin{cases} y_k(t), t \in [0, T_k] \\ y_k(t) + \int_{T_k}^{t} Ce^{A(t-\tau)}B\tilde{u}_k(\tau)d\tau, t \in (T_k, T] \end{cases},$$

$$\tilde{e}_k(t) = \begin{cases} e_k(t), t \in [0, T_k] \\ e_k(t) - \int_{T_k}^{t} Ce^{A(t-\tau)}B\tilde{u}_k(\tau)d\tau, t \in (T_k, T] \end{cases}$$

The implementation of the algorithm comprises the following steps:

Step 101: setting a sampling period $T_s$ of a controlled continuous system, the sampled discrete sequence is $$n \in \left\{0, 1, 2, \ldots, \left\lfloor \frac{T}{T_S} \right\rfloor\right\};$$

then a corresponding discrete time series is:

$$t \in \left\{0, T_S, 2T_S, \ldots, \left\lfloor \frac{T}{T_S} \right\rfloor \cdot T_S \right\}$$

Step 102: obtaining the expected output trajectory $y_d(t)$, performing the sampling according to the sampling period $T_s$ to obtain the sampled expected output sequence $y_d(n \cdot T_s)$, $$n \in \left\{0, 1, 2, \ldots, \left\lfloor \frac{T}{T_S} \right\rfloor \right\},$$

and defining the sequence as $\hat{y}_d(n)$;

Step 103: setting an initial continuous input signal of the controlled system as $\tilde{u}_0(t)$, which satisfies:

$$\tilde{u}_0(t) = \begin{cases} \tilde{u}_0(0), t \in [0, T_S) \\ \tilde{u}_0(T_S), t \in [T_S, 2T_S) \\ \vdots \\ \tilde{u}_0\left(\left\lfloor \frac{T}{T_S} \right\rfloor \cdot T_S\right), t \in \left[\left\lfloor \frac{T}{T_S} \right\rfloor \cdot T_S, T\right] \end{cases}.$$

Step 104: according to the following mapping relationship:

$$u_k(t) = \begin{cases} \tilde{u}_k(t), t \in [0, T_k] \\ 0, t \in (T_k, T] \end{cases}$$

Using the control signal $\tilde{u}_k(t)$ to generate the real control signal $u_k(t)$ and inputting the signal $u_k(t)$ to the actual controlled system;

Step 105: outputting $y_k(t)$ from the actual controlled system, and its mapping relationship with the output $\tilde{y}_k(t)$ of the extended system:

$$\tilde{y}_k(t) = \begin{cases} y_k(t), & t \in [0, T_k] \\ y_k(t) + \int_{T_k}^{t} Ce^{A(t-\tau)} B\tilde{u}_k(\tau) d\tau, & t \in (T_k, T] \end{cases},$$

performing the sampling on $\tilde{y}_k(t)$ according to the sampling period $T_s$ to obtain the output sequence $\tilde{y}_k(n \cdot T_s)$, $$n \in \left\{0, 1, 2, \ldots, \left\lfloor \frac{T}{T_S} \right\rfloor \right\},$$

and defining the sequence as $\hat{y}_k(n)$, specifically as follows:

$$\hat{y}_k(n) = \begin{cases} y_k(n \cdot T_S), & n \in \left\{0, 1, 2, \ldots, \left\lfloor \frac{T_k}{T_S} \right\rfloor \right\} \\ y_k(n \cdot T_S) + \int_{T_k}^{n \cdot T_S} Ce^{A(n \cdot T_S - \tau)} B\tilde{u}_k(\tau) d\tau, & n \in \left\{\left\lfloor \frac{T_k}{T_S} \right\rfloor, \left\lceil \frac{T_k}{T_S} \right\rceil + 1, \ldots, \left\lfloor \frac{T}{T_S} \right\rfloor \right\} \end{cases}.$$

Step 106: according to the sampling output sequence $\hat{y}_k(n)$, combined with the expected output trajectory sequence $\hat{y}_d(n)$, we define the error sequence $$\bar{e}_k(n) = \hat{y}_d(n) - \hat{y}_k(n),$$

the sampling error function sequence for calculating the extended system is $$\hat{e}_k(n) = \begin{cases} \bar{e}_k(n), & n \in \left\{0, 1, 2, \ldots, \left\lfloor \frac{T_k}{T_S} \right\rfloor \right\} \\ \bar{e}_k(n) - \int_{T_k}^{n \cdot T_S} Ce^{A(n \cdot T_S - \tau)} B\tilde{u}_k(\tau) d\tau, & n \in \left\{\left\lfloor \frac{T_k}{T_S} \right\rfloor, \left\lceil \frac{T_k}{T_S} \right\rceil + 1, \ldots, \left\lfloor \frac{T}{T_S} \right\rfloor \right\} \end{cases},$$

with additional definition $$\hat{e}_k(T) = y_d(T) - \tilde{y}_k(T) - \int_{T_k}^{T} Ce^{A(T-\tau)} B\tilde{u}_k(\tau) d\tau.$$

Step 107: calculating an iterative learning gain L, which is required to satisfy the following convergence conditions:

$$\|I - LCB\| \leq \rho < 1.$$

Step 108: according to the sampling error function sequence and the iterative learning gain, setting an iterative learning control law as follows:

$$\tilde{u}_{k+1}(n \cdot T_S) = \tilde{u}_k(n \cdot T_S) + L\dot{\hat{e}}_k(n), n \in \left\{0, 1, 2, \ldots, \left\lfloor \frac{T}{T_S} \right\rfloor \right\},$$

wherein $\tilde{u}_{k+1}(t)$ represents a control input signal of the extended system in a k+1-th iteration, $\tilde{u}_k(t)$ represents a control input signal of the extended system in a k-th iteration, and an derivative $\dot{\hat{e}}_k(n)$ of the sampling error function sequence may be approximated as follows:

$$\dot{\hat{e}}_k(n) = \begin{cases} \frac{\hat{e}_k((n+1)) - \hat{e}_k(n)}{T_S}, n \in \left\{0, 1, 2, \ldots, \left\lfloor \frac{T}{T_S} \right\rfloor - 1 \right\} \\ \frac{\hat{e}_k(T) - \hat{e}_k(n)}{T_S}, n = \left\lfloor \frac{T}{T_S} \right\rfloor \end{cases},$$

according to the iterative learning control law, updating the control input signal $\tilde{u}_{k+1}(t)$ of a next iteration, and $\tilde{u}_{k+1}(t)$ satisfies:

$$\tilde{u}_{k+1}(t) = \begin{cases} \tilde{u}_{k+1}(0), t \in [0, T_S) \\ \tilde{u}_{k+1}(T_S), t \in [T_S, 2T_S) \\ \vdots \\ \tilde{u}_{k+1}\left(\left\lfloor \frac{T}{T_S} \right\rfloor \cdot T_S\right), t \in \left[\left\lfloor \frac{T}{T_S} \right\rfloor \cdot T_S, T\right] \end{cases}.$$

In a preferred embodiment, after the transmitting the iterative input voltage to the piezoelectric motor, the method further comprises: step 109, performing the iterative steps 104 to 108 repeatedly until the sampling error function sequence is smaller than a preset tolerance value range, and stopping the iterations.

Figure 2:
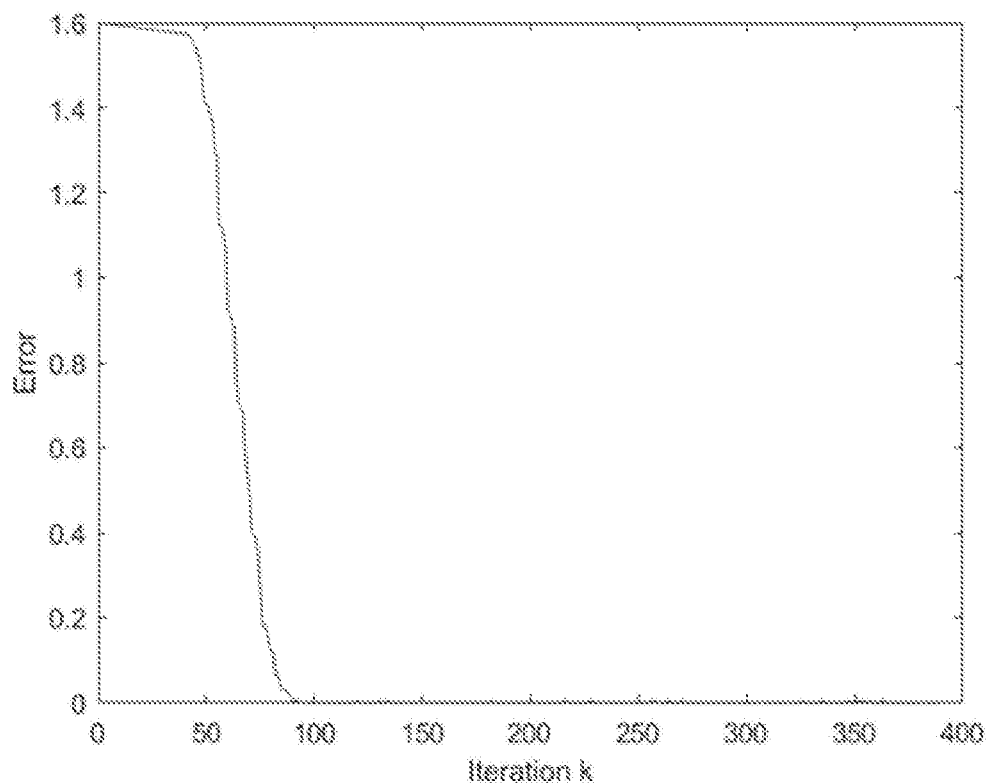
FIG. 2: is the output error diagram under an exemplary piezoelectric motor model of the present invention.
Figure 3:
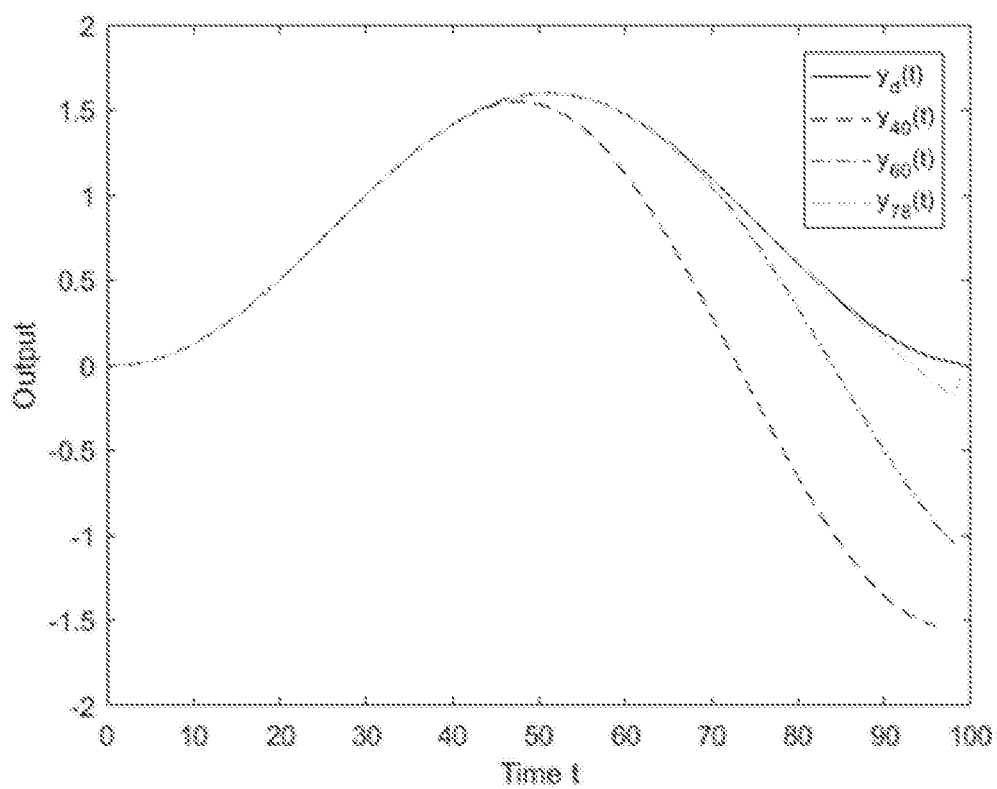
FIG. 3: is a system output diagram of the expected trajectory and different number of iterations under an exemplary piezoelectric motor model of the present invention.

Please refer to FIG. 2 and FIG. 3. The piezoelectric motor model used in FIG. 2 and FIG. 3 is as follows:

$$\begin{cases} \dot{x}_{1,k}(t) = x_{2,k}(t), \\ \dot{x}_{2,k}(t) = -\frac{K_v}{M} x_{2,k}(t) + \frac{K_f}{M} u_k(t), \\ y_k(t) = x_{2,k}(t), t \in [0, T_k] \end{cases}$$

-continued $$\begin{cases} \dot{x}_{1,k}(t) = x_{2,k}(t), \\ \dot{x}_{2,k}(t) = -\dfrac{K_v}{M} x_{2,k}(t), \\ y_k(t) = x_{2,k}(t), t \in (T_k, T] \end{cases}$$

The expected trajectory is:

$$y_d(t) = 0.8\left[1 + \sin\left(2\pi t - \dfrac{\pi}{2}\right)\right], t \in [0, 1].$$

$x_{1,k}(t)$ and $x_{2,k}(t)$ are the motor position and motor speed respectively, setting the motor position as 0 m and the motor speed as 0 m/s at the initial moment of each iteration, $\overline{M}$ represents the moving mass, the value is 1 kg, $K_v$ is the velocity damping factor, the value is 80N, $K_f$ is the force constant of the motor, which is 6 N/V, that is $$A = \begin{bmatrix} 0 & 1 \\ 0 & -80 \end{bmatrix}, B = \begin{bmatrix} 0 \\ 6 \end{bmatrix},$$

C=[0 1]. The sampling period $T_s$ is 0.01 s, the time period T is 1 s, and according to the convergence condition, calculating the iterative learning gain L to be 0.15, and the algorithm shown in algorithm 107 is used:

$$\|I - LCB\| \leq \rho < 1.$$

In this application, it may be seen that the error index converges within a finite number of times. As the number of iterations increases, the error index almost completely converges at the 90th iteration, that is, the output trajectory of the motor almost matches the expected output trajectory.

It may be seen as two systems on the timeline. The first system is controlled, its running time length $T_k$ is iteratively varied, and the running time interval is $[0, T_k]$. The second system control input is 0 and its operating interval is $(T_k, T]$. In this embodiment, firstly, it is assumed that the initial state of the motor is static, so the speed is 0 m/s, and according to the algorithm shown in step 101, the sampling period $T_s$ of the controlled continuous system is set; secondly, to obtain the expected output value of the motor sampling, the algorithm used is the algorithm shown in step 102; then, set the initial continuous input signal $u_0(t)$ of the controlled system to 0, and according to the mapping relationship, use the algorithm shown in step 104 to obtain the real control signal input to the actual controlled system, and use the algorithm shown in step 105 to obtain the sampling output sequence of the extended system in this iteration according to the actual system output; then according to the sampling output sequence, use the algorithm shown in step 106 to calculate the sampling error function sequence of the extended system in combination with the sampling period sequence; finally, according to the sampling error function sequence, iterative learning gain and iterative learning control rate, update the control input of the new expansion system in the next iteration and transmit it to the motor control terminal, so that the error index gradually converges. When the running time arrives in $(T_k, T]$, that is, the second system starts to function, the system control input is 0, that is, the system is not under control, but the ideal control input at the corresponding moment may still be calculated according to the iterative learning control law, and finally causes the virtual error $\tilde{e}_k(t)$ of the system to converge. According to the expression of the virtual error, it may be seen that the actual error $e_k(t)$ of the system completely converges within the $[0, T_k]$, and within the interval $(T_k, T]$, it converges to $\int_{T_k}^{t} Ce^{A(T-\tau)} B\tilde{u}_k(\tau)d\tau$. When, the actual error of the system fully converges in [0, T]. Since the running time length $T_k$ of the controlled system changes iteratively, there is a certain probability to reach T, and because the number of iterations k tends to be infinite, the system therefore has infinite iterations to reach T, so that the actual error of the system completely converges in [0, T]. The system only needs to control the output of the previous time period, and does not need to control the latter time period. When the number of iterations tends to infinity, the output of the system may also completely track the expected output, thus avoiding unnecessary energy consumption.

FIG. 2 is an output error diagram in this application scenario. In this application scenario, it may be seen that the error means that the error quickly converges to within the tolerance error within a finite number of times, and the error function is $$\text{Error}(k) = \sup_{0 < t < 1} |y_d(t) - y_k(t)|.$$

It may be seen from FIG. 2 that, for the motor using the iterative learning-based energy-saving control algorithm, the error function converges to within the tolerance error before the 90th iteration. FIG. 3 shows the system output and the expected output trajectory of the 40th, 60th and 78th iterations. It may be seen from FIG. 3 that the output trajectory of the system gradually tracks the expected output trajectory as the number of iterations increases.

Figure 4:
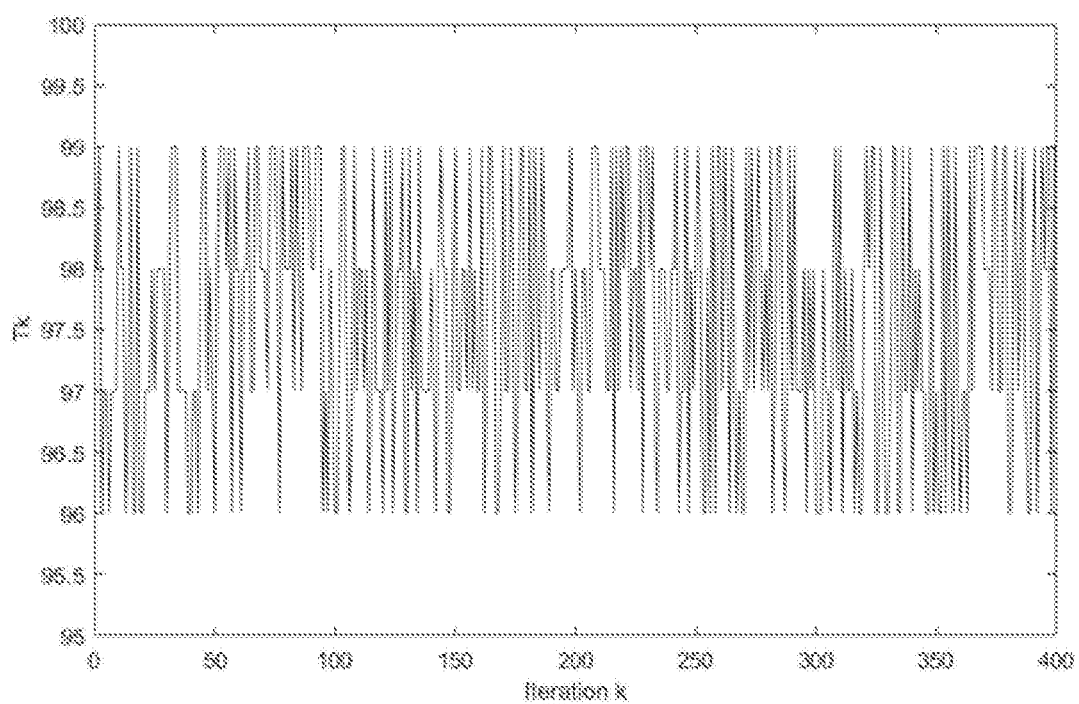
FIG. 4: is a graph showing the rounding of the running time length $T_k$ of an exemplary piezoelectric motor model of the present invention.

FIG. 4 is a graph of the rounding of the running time length $T_k$ in this application scenario. $T_k$ varies between 96 and 99.

The algorithm proposed by the invention not only has no limitation of the controlled time interval, but also able to effectively save energy consumption on the basis of precise tracking control, which has high practical application value. The specific idea of the algorithm is to make the controller end the control input in advance at a specific time when it is closer to a target point, letting the robotic arm to reach the target point by inertia. Compared with a control method that relies on motor braking to gradually stop the robotic arm, the former avoids unnecessary energy consumption compared with the latter.

The specific embodiments described above further describe the purpose, technical solutions and beneficial effects of the present invention in detail. It should be understood that the above descriptions are only specific embodiments of the present invention, and are not intended to limit the protection scope of the present invention. It is particularly pointed out that for those skilled in the art, any modification, equivalent replacement, improvement, etc. made within the spirit and principle of the present invention should be included within the protection scope of the present invention.

The invention claimed is:

1. A piezoelectric motor energy-saving control method based on an iterative learning, comprising:
    setting a sampling period of a piezoelectric motor;
    obtaining an expected output trajectory of the piezoelectric motor, and performing a sampling according to the sampling period to obtain a sampled expected output sequence;
    setting an initial control input signal of the piezoelectric motor;

obtaining an actual control input signal according to a mapping relationship of the initial control input signal, and transmitting the actual control input signal to the piezoelectric motor to obtain an actual output position of the piezoelectric motor;

obtaining a mapping relationship of an output position of the piezoelectric motor according to the actual output position, and performing a sampling on the mapping relationship of the output position of the piezoelectric motor according to the sampling period to obtain a sampled actual output sequence;

performing a difference calculation between the sampled expected output sequence and the sampled actual output sequence to obtain a sampling error function sequence;

calculating an iterative learning gain parameter according to a preset convergence condition;

calculating an iterative input voltage required by the piezoelectric motor for performing iterations according to the sampling error function sequence and the iterative learning gain parameter, and transmitting the iterative input voltage to the piezoelectric motor.

2. The piezoelectric motor energy-saving control method based on an iterative learning according to claim 1, wherein after transmitting the iterative input voltage to the piezoelectric motor, the method further comprises: repeating steps of the iterations until the sampling error function sequence is smaller than a preset allowable error value range, stopping the iterations.

3. The piezoelectric motor energy-saving control method based on an iterative learning according to claim 1, wherein the step of setting the sampling period of the piezoelectric motor is: setting the sampling period $T_s$ of the piezoelectric motor, the sampled discrete sequence is $$n \in \left\{0, 1, 2, \ldots, \left\lfloor \frac{T}{T_S} \right\rfloor\right\};$$

then a corresponding discrete time series is:

$$t \in \left\{0, T_S, 2T_S, \ldots, \left\lfloor \frac{T}{T_S} \right\rfloor \cdot T_S\right\};$$

where t is a running time.

4. The piezoelectric motor energy-saving control method based on an iterative learning according to claim 3, wherein the step of obtaining an expected output trajectory of the piezoelectric motor, and performing a sampling according to the sampling period to obtain a sampled expected output sequence comprises: obtaining the expected output trajectory $y_d(t)$, performing the sampling according to the sampling period $T_s$ to obtain the sampled expected output sequence $y_d(n \cdot T_s)$, $$n \in \left\{0, 1, 2, \ldots, \left\lfloor \frac{T}{T_S} \right\rfloor\right\},$$

and defining the sampled expected output sequence as $\hat{y}_d(n)$.

5. The piezoelectric motor energy-saving control method based on an iterative learning according to claim 4, wherein the step of setting the initial control input signal of the piezoelectric motor comprises: setting an initial continuous input signal of the piezoelectric motor as $\tilde{u}_0(t)$, which satisfies:

$$\tilde{u}_0(t) = \begin{cases} \tilde{u}_0(0), t \in [0, T_S) \\ \tilde{u}_0(T_S), t \in [T_S, 2T_S) \\ \vdots \\ \tilde{u}_0\left(\left\lfloor \frac{T}{T_S} \right\rfloor \cdot T_S\right), t \in \left[\left\lfloor \frac{T}{T_S} \right\rfloor \cdot T_S, T\right] \end{cases}.$$

6. The piezoelectric motor energy-saving control method based on an iterative learning according to claim 5, wherein the mapping relationship of the initial control input signal is:

$$u_k(t) = \begin{cases} \tilde{u}_k(t), & t \in [0, T_k] \\ 0, & t \in (T_k, T] \end{cases};$$

wherein $u_k(t)$ is the actual control input signal.

7. The piezoelectric motor energy-saving control method based on an iterative learning according to claim 6, wherein the mapping relationship of the output position of the piezoelectric motor is:

$$\tilde{y}_k(t) = \begin{cases} y_k(t), t \in [0, T_k] \\ y_k(t) + \int_{T_k}^{t} Ce^{A(t-\tau)} B\tilde{u}_k(\tau) d\tau, t \in (T_k, T] \end{cases},$$

wherein $y_k(t)$ is the actual output position, and $\tilde{y}_k(t)$ is the mapping relationship of the output position of the piezoelectric motor;

the step of performing the sampling to obtain the sampled actual output sequence is: performing the sampling on $\tilde{y}_k(t)$ according to the sampling period $T_s$ to obtain the sampled actual output sequence $\tilde{y}_k(n \cdot T_s)$ $$n \in \left\{0, 1, 2, \ldots, \left\lfloor \frac{T}{T_S} \right\rfloor\right\},$$

and defining the sampled actual output sequence as $\hat{y}_k(n)$, specifically as follows:

$$\hat{y}_k(n) =$$

$$\begin{cases} y_k(n \cdot T_S), & n \in \left\{0, 1, 2, \ldots, \left\lfloor \frac{T_k}{T_S} \right\rfloor\right\} \\ y_k(n \cdot T_S) + \int_{T_k}^{n \cdot T_S} Ce^{A(n \cdot T_S - \tau)} B\tilde{u}_k(\tau), & n \in \left\{\left\lceil \frac{T_k}{T_S} \right\rceil, \left\lceil \frac{T_k}{T_S} \right\rceil + 1, \ldots, \left\lfloor \frac{T}{T_S} \right\rfloor\right\} \end{cases}.$$

8. The piezoelectric motor energy-saving control method based on an iterative learning according to claim 7, wherein a specific algorithm for performing the difference calculation between the sampled expected output sequence and the sampled actual output sequence is: $\bar{e}_k(n)=\hat{y}_d(n)-\hat{y}_k(n)$; then the sampling error function sequence is:

$$\hat{e}_k(n) = \begin{cases} \bar{e}_k(n), & n \in \left\{0, 1, 2, \ldots, \left\lfloor \dfrac{T_k}{T_S} \right\rfloor\right\} \\ \bar{e}_k(n) - \displaystyle\int_{T_k}^{n \cdot T_S} Ce^{A(n \cdot T_S - \tau)} B\tilde{u}_k(\tau) d\tau, & n \in \left\{\left\lceil \dfrac{T_k}{T_S} \right\rceil, \left\lceil \dfrac{T_k}{T_S} \right\rceil + 1, \ldots, \left\lfloor \dfrac{T}{T_S} \right\rfloor\right\} \end{cases},$$

then defining:

$$\hat{e}_k(T) = y_d(T) - \bar{y}_k(T) - \int_{T_k}^{T} Ce^{A(T-\tau)} B\tilde{u}_k(\tau) d\tau.$$

9. The piezoelectric motor energy-saving control method based on an iterative learning according to claim 8, wherein the preset convergence condition is: $\|I-LCB\| \leq \rho < 1$.

10. The piezoelectric motor energy-saving control method based on an iterative learning according to claim 9, wherein the steps of calculating an iterative input voltage required by the piezoelectric motor for performing iterations according to the sampling error function sequence and the iterative learning gain parameter, and transmitting the iterative input voltage to the piezoelectric motor comprise:

according to the sampling error function sequence and the iterative learning gain parameter, an iterative learning control law is set as:

$$\tilde{u}_{k+1}(n \cdot T_S) = \tilde{u}_k(n \cdot T_S) + L\dot{\hat{e}}_k(n), n \in \left\{0, 1, 2, \ldots, \left\lfloor \dfrac{T}{T_S} \right\rfloor\right\},$$

wherein $\tilde{u}_{k+1}(t)$ represents a control input signal of the piezoelectric motor in $a^{k+1}$-th iteration, $\dot{\hat{e}}_k(n)$ represents control input signal of the piezoelectric motor in $a^k$-th iteration, and an derivative $\dot{\hat{e}}_k(n)$ of the sampling error function sequence is calculated as follows:

$$\dot{\hat{e}}_k(n) = \begin{cases} \dfrac{\hat{e}_k((n+1)) - \hat{e}_k(n)}{T_S}, & n \in \left\{0, 1, 2, \ldots, \left\lfloor \dfrac{T}{T_S} \right\rfloor - 1\right\} \\ \dfrac{\hat{e}_k(T) - \hat{e}_k(n)}{T_S}, & n = \left\lfloor \dfrac{T}{T_S} \right\rfloor \end{cases},$$

wherein according to the iterative learning control law, updating the control input signal $\tilde{u}_{k+1}(t)$ of a next iteration, and $\tilde{u}_{k+1}(t)$ satisfies:

$$\tilde{u}_{k+1}(t) = \begin{cases} \tilde{u}_{k+1}(0), t \in [0, T_S) \\ \tilde{u}_{k+1}(T_S), t \in [T_S, 2T_S) \\ \vdots \\ \tilde{u}_{k+1}\left(\left\lfloor \dfrac{T}{T_S} \right\rfloor \cdot T_S\right), t \in \left[\left\lfloor \dfrac{T}{T_S} \right\rfloor \cdot T_S, T\right] \end{cases}.$$

11. The piezoelectric motor energy-saving control method based on an iterative learning according to claim 2, wherein the step of setting the sampling period of the piezoelectric motor is: setting the sampling period $T_s$ of the piezoelectric motor, the sampled discrete sequence is $$n \in \left\{0, 1, 2, \ldots, \left\lfloor \dfrac{T}{T_S} \right\rfloor\right\};$$

then a corresponding discrete time series is:

$$t \in \left\{0, T_S, 2T_S, \ldots, \left\lfloor \dfrac{T}{T_S} \right\rfloor \cdot T_S\right\};$$

where t is a running time.

* * * * *